United States Patent
Dehoff et al.

(10) Patent No.: US 11,827,289 B1
(45) Date of Patent: Nov. 28, 2023

(54) PLANETARY ROLLER SCREW DRIVE WITH PULLEY MOUNTED SUPPORT BEARING INNER RACE

(71) Applicant: Schaeffler Technologies AG & Co. KG, Herzogenaurach (DE)

(72) Inventors: Kyle Dehoff, Canal Fulton, OH (US); Trenton Dean, Casco, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/882,690

(22) Filed: Aug. 8, 2022

(51) Int. Cl.
*B62D 5/00* (2006.01)
*B62D 5/04* (2006.01)
*F16H 25/22* (2006.01)
*F16H 25/20* (2006.01)

(52) U.S. Cl.
CPC ......... *B62D 5/0445* (2013.01); *B62D 5/0424* (2013.01); *F16H 25/2252* (2013.01); *F16H 2025/2081* (2013.01); *F16H 2025/2096* (2013.01)

(58) Field of Classification Search
CPC .. B62D 5/0445; B62D 5/0451; B62D 5/0424; F16H 25/2252; F16H 2025/2081; F16H 2025/2096
See application file for complete search history.

(56) References Cited

U.S. PATENT DOCUMENTS

| 2006/0291765 | A1* | 12/2006 | Hayward | F16C 33/588 |
| | | | | 384/572 |
| 2019/0118854 | A1* | 4/2019 | Tate | B62D 5/001 |

FOREIGN PATENT DOCUMENTS

| DE | 102015206735 | | 5/2016 | |
| DE | 102019126875 | A1 * | 4/2021 | ............... B62D 3/10 |
| GB | 1234988 | | 6/1971 | |
| WO | WO-2020164655 | A1 * | 8/2020 | ........... B62D 5/0451 |

\* cited by examiner

*Primary Examiner* — Zakaria Elahmadi
(74) *Attorney, Agent, or Firm* — Volpe Koenig (57) ABSTRACT

A planetary roller screw drive for a steering actuator includes a screw spindle and a planetary roller assembly arranged thereon. The planetary roller assembly includes a roller body, planetary rollers arranged between the screw spindle and the roller body and which mesh with the screw spindle and with the roller body. A planetary roller carrier holds the planetary rollers. A drive pulley is connected for conjoint rotation with the planetary roller carrier and is rotatably mountable on a housing via first and second radial bearings. These radial bearings include respective inner race rings that are located on the drive pulley. First and second face plates are located at axial end regions of the drive pulley, and the face plates are rotationally fixed to respective inner race rings. The face plates are also rotationally fixed to the planetary roller carrier. An assembly method is also provided.

19 Claims, 4 Drawing Sheets

PLANETARY ROLLER SCREW DRIVE WITH PULLEY MOUNTED SUPPORT BEARING INNER RACE

TECHNICAL FIELD

The present disclosure relates to a planetary roller screw drive which converts a rotary motion into a translational motion. The disclosure also relates to a steering actuator, in particular for a rear-axle steering system of a motor vehicle, having such a planetary roller screw drive.

BACKGROUND

A planetary roller screw drive is known from DE 10 2015 206 735 B3. This planetary roller screw drive is provided with a nut arranged on a screw spindle and with planetary rollers arranged between the screw spindle and the nut and which mesh via their planetary groove profile, on a radially outer side, with a nut-side groove profile and, on a radially inner side, with a thread profile of the screw spindle. This planetary roller screw drive also has a planetary roller support having pockets, which are arranged distributed over the circumference and in which the planetary rollers are rotatably mounted about their planetary roller axes. The planetary roller support is connected for conjoint rotation with a drive sleeve that is rotatably driven about a spindle axis of the screw spindle. The drive sleeve is rotatably mounted on a machine part by a bearing referred to as the main bearing.

Similar arrangements are also known in which a belt drive is connected to a pulley that is used to drive the planetary roller support. In certain applications, in order to save weight and reduce costs, certain parts are made of plastic, including the pulley.

Providing proper rotational support for the spindle as well as the planetary roller support and pulley for reliable function while maintaining a reduced weight is a challenge.

SUMMARY

In one aspect, a planetary roller screw drive is provided having a screw spindle and a planetary roller assembly arranged on the screw spindle. The planetary roller assembly includes a roller body and planetary rollers, having a planetary groove profile and a roller body-side groove profile, arranged between the screw spindle and the roller body and which mesh via the planetary groove profile with a thread profile of the screw spindle and via the roller body-side groove profile with a roller body groove profile of the roller body. A planetary roller carrier is provided in which the planetary rollers are rotatably mounted about respective planetary roller axes thereof. A drive pulley that is adapted to be rotatably driven about a spindle axis of the screw spindle, is connected for conjoint rotation with the planetary roller carrier, and is configured to be rotatably mounted on a housing via first and second radial bearings located at first and second axial end regions of the drive pulley. The first and second radial bearings including respective first and second inner race rings that are located on a radially outer surface of the drive pulley. First and second face plates are located respectively at the first and second axial end regions of the drive pulley, with the first face plate being rotationally fixed to the first inner race ring and the second face plate being rotationally fixed to the second inner race ring. The first and second face plates are also rotationally fixed to the planetary roller carrier.

With this arrangement, when the pulley is made of a light-weight material, such as a plastic or composite, whose properties would not be sufficient to support and/or retain the bearings that would typically be pressed onto the outer surface of the pulley, the use of the first and second inner race rings that are separately engaged with the face plate while still being supported on the radially outer surface of the pulley allows for proper support of the pulley when the planetary roller assembly is installed in the housing.

Additional features described below provide enhanced functionality and performance and also facilitate assembly.

In one embodiment, the drive pulley includes radially inwardly directed teeth at the first and second axial end regions, and the first and second face plates include corresponding radially outwardly directed teeth that engage with the inwardly directed teeth to rotationally fix the drive pulley to the first and second face plates as well.

In one embodiment, the first and second face plates are rotationally fixed to the planetary roller carrier via radially inwardly directed teeth on the first and second face plates engaging with complementary projections of the planetary roller carrier.

In one embodiment, the first face plate is rotationally fixed to the first inner race ring via radially inwardly directed projections on the first inner race ring engaging with at least some of the corresponding radially outwardly directed teeth of the first face plate, and the second face plate is rotationally fixed to the second inner race ring via radially inwardly directed projections on the second race inner ring engaging with at least some of the corresponding radially outwardly directed teeth of the second face plate.

In one embodiment, the drive pulley includes axially extending first pulley fingers and axially extending second pulley fingers that extend respectively from the first and second axial end regions, and the first and second pulley fingers are elastically deflectable radially inwardly and outwardly. The first pulley fingers each include a radially outwardly directed projection that is configured to retain the first inner race ring axially on the drive pulley, and the second pulley fingers each include a radially outwardly directed projection that is configured to retain the second inner race ring axially on the drive pulley.

In one embodiment, the first pulley fingers each include a radially inwardly directed projection that is configured to retain the first face plate axially in position, and the second pulley fingers each include a radially inwardly directed projection that is configured to retain the second face plate axially in position.

In one embodiment, the planetary roller assembly further includes first and second axial bearings located respectively between the first and the housing and between the second face plate and the housing. Here, the radially inwardly directed projections of the first and second pulley fingers engage respectively over face plate-side race rings of the first and second axial bearings. This also holds the axial bearings in position prior to assembly of the planetary roller assembly in the housing.

The first and second pulley fingers may be elastically deflected radially outwardly for installation of the respective first and second face plates, as well as the other internal components of the planetary roller assembly.

Additionally, the first and second pulley fingers may also be elastically deflected radially inwardly for installation of the first and second inner race rings. Once assembled and the first and second pulley fingers return to their neutral (undeflected) position, and the radially inwardly and outwardly directed projections hold the components axially together.

In a further aspect, third and fourth axial bearings are located respectively between the first face plate and a first axial end of the roller body and the second face plate and a second axial end of the roller body.

In another aspect, an actuator for a rear-axle steering system of a motor vehicle is provided having the planetary roller screw drive with one or more of the features described herein as well as a push rod having ends that face away from one another and are configured for articulation of rear wheels of the motor vehicle. The screw spindle is part of or connected to the push rod.

The actuator can have an electric motor, and a belt drive having a toothed belt which loops around a motor pinion of the electric motor and the drive pulley.

In one embodiment of the actuator, the housing accommodates the motor pinion and the planetary roller screw drive therein.

In a further aspect, a method of assembling a planetary roller assembly for a planetary roller screw drive is provided, and includes the steps of: (a) assembling a roller body onto planetary rollers having a planetary groove profile and a roller body-side groove profile, that are adapted to be arranged between the screw spindle and the roller body and which mesh via the roller body-side groove profile with a roller body groove profile of the roller body, (b) rotatably mounting the planetary rollers in a planetary roller carrier such that the planetary rollers are rotatably mounted about respective planetary roller axes thereof, (c) installing a drive pulley around the roller body, (d) installing first and second face plates respectively at first and second axial end regions of the drive pulley, with the first and second face plates being rotationally fixed to the planetary roller carrier via a meshing feature, and the first and second face plates being rotationally fixed to the drive pulley via radially inwardly directed teeth at the first and second axial end regions of the drive pulley engaging with radially outwardly directed teeth of the first and second face plates, and (e) then installing respective first and second inner race rings of first and second radial bearings onto the respective first and second axial end regions of the drive pulley, with the first and second inner race rings also being rotationally fixed to the first and second face plates. This rotationally fixed connection can be attained as discussed above.

The method preferably also includes installing inner axial bearings at axial ends of the roller body prior to installing the first and second face plates in step (d). The method may further include also installing outer axial bearings on the first and second face plates before installing the first and second inner race rings of first and second radial bearings in step (e).

In one embodiment, the drive pulley includes axially extending first pulley fingers and axially extending second pulley fingers that extend respectively from the first and second axial end regions, with the first and second pulley fingers being elastically deflectable radially inwardly and outwardly, and the first pulley fingers each include a radially outwardly directed projection and the second pulley fingers each include a radially outwardly directed projection. Here, the method further includes (f) retaining the first inner race ring axially on the drive pulley with the radially outwardly directed projection on the first pulley fingers; and (g) retaining the second inner race ring axially on the drive pulley with the radially outwardly directed projections on the second pulley fingers.

In one embodiment, the first pulley fingers each include a radially inwardly directed projection and the second pulley fingers each include a radially inwardly directed projection. Here, the method further includes: (h) retaining the first face plate axially in position with the radially inwardly directed projections of the first pulley fingers; and (i) retaining the second face plate axially in position with the radially inwardly directed projections of the second pulley fingers.

In one embodiment, the planetary roller assembly further comprises first and second axial bearings located respectively between the first and second face plates and the housing, and the radially inwardly directed projections of the first and second pulley fingers engage respectively over face plate-side race rings of the first and second axial bearings.

In one embodiment, the method further includes (j) elastically deflecting the first and second pulley fingers radially outwardly for installation of the respective first and second face plates in step (d).

The method can also include (k) elastically deflecting the first and second pulley fingers radially inwardly for installation of the first and second inner race rings on the drive pulley in step (e).

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction approximately normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass+ or −10% of an indicated value unless otherwise noted. The terminology includes the words specifically noted above, derivatives thereof and words of similar import.

Figure 1:
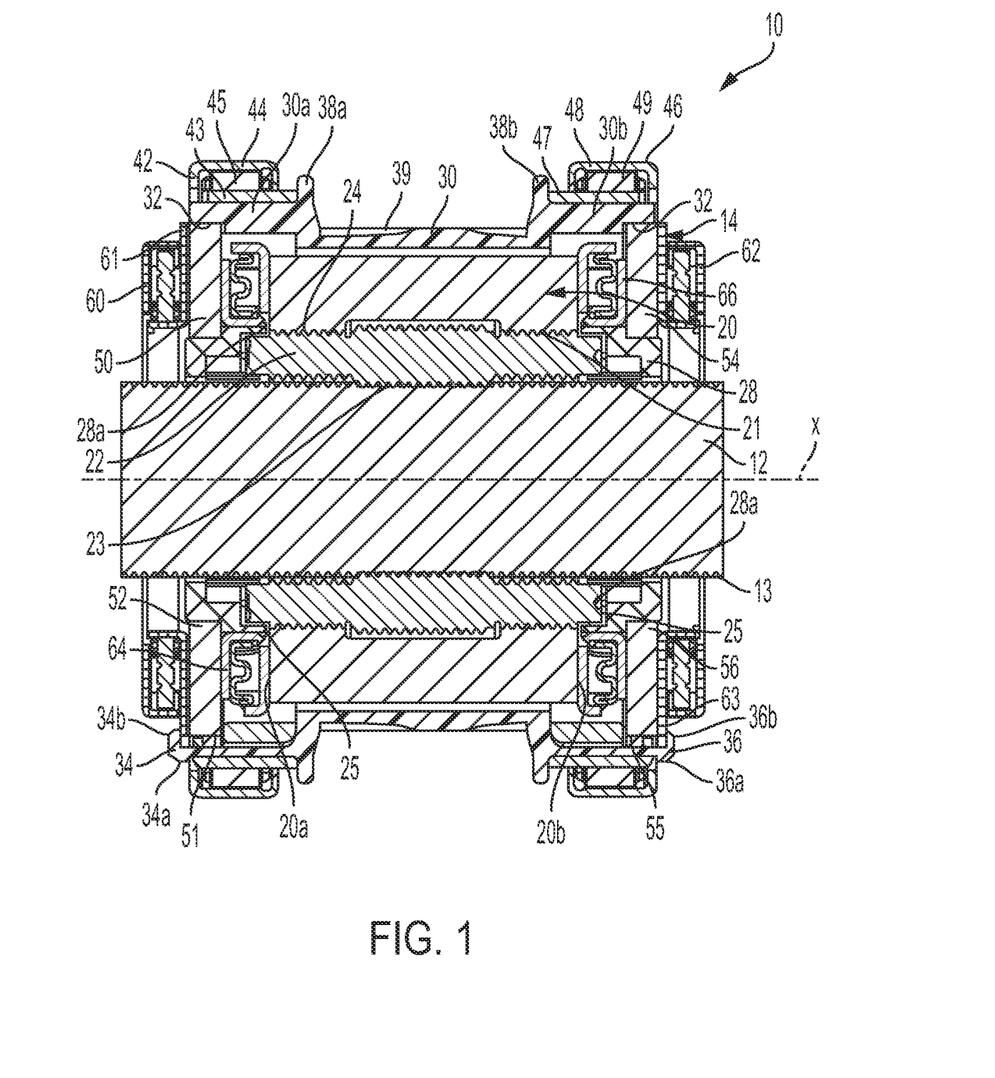
FIG. 1 is a cross-sectional view through a planetary roller assembly of a planetary roller screw drive according to the present disclosure.

Referring to FIG. 1, a planetary roller screw drive 10 is shown in cross-section. The planetary roller screw drive 10 includes a screw spindle 12 as well as a planetary roller assembly 14 that is arranged on the screw spindle 12.

Figure 2:
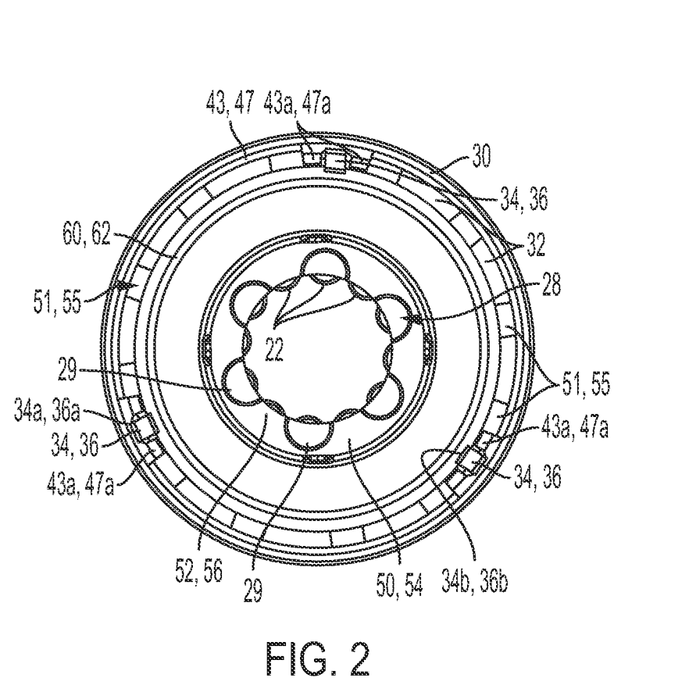
FIG. 2 is an end view of the planetary roller assembly of the planetary roller screw drive shown in FIG. 1 showing the interlocking of the radial support bearing inner race ring(s) with the drive pulley and the face plate(s) in order to radially lock the drive pulley and the inner race rings of the support bearings to the face plates which are also shown with a rotational locking feature to the planetary roller carrier.
Figure 3:
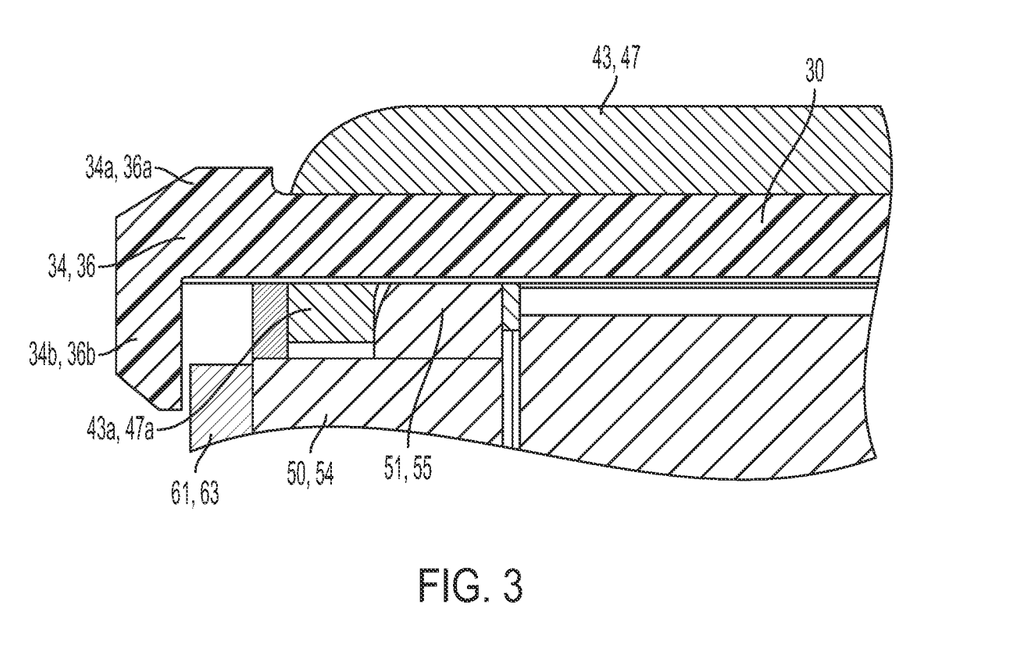
FIG. 3 is an enlarged cross-sectional view showing the interlocking of the inner race ring(s), the drive pulley, and the face plate labeled for each of the axial end regions of the planetary roller assembly.

As shown in FIGS. 1-3, the planetary roller assembly 14 includes a roller body 20 as well as planetary rollers 22, each having a planetary groove profile 23 and a roller body-side groove profile 24, arranged between the screw spindle 12 and the roller body 20. The planetary rollers 22 mesh via the planetary groove profiles 23 with a thread profile 13 of the screw spindle, and mesh via the roller body-side groove profile 24 with a roller body groove profile 21 of the roller body 20.

The planetary rollers 22 are supported in a planetary roller carrier 28 in which the planetary rollers 22 are rotatably mounted about respective planetary roller axes thereof. The planetary roller carrier 28 includes pockets 28a that are distributed over the circumference thereof and in which the planetary rollers 22 are rotatably mounted. FIG. 1 shows the journal ends 25 formed at the axial ends of the planetary rollers 22 which engage in the bearing pockets 28a of the planetary roller carrier 28.

A drive pulley 30, which can be made of a light weight material such as a plastic or composite, that is adapted to be rotatably driven about a spindle axis X of the spindle 12 is provided. The drive pulley 30 is connected for co-joint rotation with the planetary roller carrier 28, is configured to be rotatably mounted on a housing 40 (shown in FIG. 4), and is supported via first and second radial bearings 42, 46 that are located at the first and second axial end regions 30a, 30b of the drive pulley 30. The first and second radial bearings 42, 46 include respective first and second inner race rings 43, 47 that are located on a radially outer surface 30c of the drive pulley 30, as well as outer race rings 44, 48 with respective rollers 45, 49 located therebetween.

These first and second radial bearings 42, 46 support the pulley 30 in use. However, the issue arises that since the pulley 30 is made of a plastic or composite light weight material, the inner race rings 43, 47 made of a bearing material, such a steel, are required for the bearings 42, 46. Further, the inner race rings 43, 47 must move in conjunction with the pulley 30, which in this case cannot be guaranteed by a press fit between the inner race rings 43, 47 and the pulley 30 due to the material properties of the pulley 30.

To address this, first and second face plates 50, 54 are located respectively at the first and second axial end regions 30a, 30b of the pulley 30. And the first face plate 50 is rotationally fixed to the first inner race ring 43, while the second face plate 54 is rotational fixed to the second inner race ring 47. Additionally, the first and second face plates 50, 54 are rotationally fixed to the planetary roller carrier 28.

Still with references to FIGS. 1-3, in order to accomplish these rotationally fixed connections, the drive pulley 30 includes radially inwardly directed teeth 32 at (best shown in FIG. 2) the first and second axial end regions 30a, 30b, and the first and second face plates 50, 54 include corresponding radially outwardly directed teeth 51, 55 that engage the inwardly directed teeth 32 of the drive pulley 30 to rotationally fix the drive pulley to the first and second face plates 50, 54.

The first face plate 50 is also rotationally fixed to the inner race ring 43 via radially inwardly directed projections 43a on the first inner race ring 43 engaging with at least some of the corresponding radially outwardly directed teeth 51 of the first face plate 50, and the second face plate 54 is rotationally fixed to the second inner race ring 47 via radially inwardly directed projections 47a on the second inner race ring 47 engaging with at least some of the corresponding radially outwardly directed teeth 55 of the second face plate 54. This results in both the first and second inner race rings 43, 47, as well as the drive pulley 30, being rotationally fixed with the first and second face plates 50, 54.

As shown in detail in FIG. 2, the connection of the first and second face plates 50, 54 to the planetary roller carrier 28 is accomplished via a meshing interface, which in this case includes radially inwardly directed teeth 52, 56 on the respective first and second face plates 50, 54 that engage with complementary projections 29 at each axial end of the planetary roller carrier 28.

In order to ensure the first and second inner race rings 43, 47 are maintained axially in position on the drive pulley 30, the drive pulley 30 includes axially extending first pulley fingers 34 and axially extending second pulley fingers 36 that extend respectively from the first and second axial end regions 30a, 30b of the drive pulley 30 in opposite axial directions. The first and second pulley fingers 34, 36 are elastically deflectable radially inwardly and outwardly, and the first pulley fingers 34 each include a radially outwardly directed projection 34a that is configured to retain the first inner race ring 43 axially on the drive pulley 30, preferably against an axially inwardly spaced annular projection 38a of the drive pulley 30, and the second pulley fingers 36 each include a radially outwardly directed projection 36a that is configured to retain the second inner race ring 47 axially on the drive pulley 30, preferably against an axially inwardly spaced annular projection 38b on the drive pulley 30.

Further, still with reference to FIGS. 1-3, the first pulley fingers 34 each include a radially inwardly directed projection 34b that is configured to retain the first face plate 50 axially in position, and the second pulley fingers 36 each include a radially inwardly directed projection 36b that is configured to retain the second face plate 54 axially in position. As shown in detail in FIG. 2, there are preferably three of the first pulley fingers 34 and correspondingly, three of the second pulley fingers 36. However, this number could vary. Additionally, still with reference to FIG. 2, the radially inwardly directed projections 43a, 47a of the first and second inner race rings 43, 47 can be notched such that they have portions located on each side of the respective first and second pulley fingers 34, 36, such that the radially outwardly directed projections 34a, 36a can engage the respective first and second inner race rings 43, 47 in an area of the radially inwardly directed projections 43a, 47a.

Referring again to FIG. 1, the planetary roller assembly 14 further includes first and second outer axial bearings 60, 62 located respectively between the first and second face plates 50, 54 and the facing portions of the housing 40 when assembled. The radially inwardly directed projections 34b, 36b of the first and second pulley fingers 34, 36 engage respectively over face plate-side race rings 61, 63 of the first and second axial bearing 60, 62. This retains these first and second axial bearings 60, 62 against the first and second face plates 50, 54, holding them in position on the planetary roller assembly 14 prior to assembly in the housing 40.

Referring to FIGS. 1 and 3, the first and second pulley fingers 34, 36 are adapted to be elastically deflected radially outwardly for the installation of the respective first and second face plates 50, 54, as well as other internal components of the planetary roller assembly 14 and the race rings 61, 63 of the first and second axial bearing 60, 62. Additionally, the first and second pulley fingers 34, 36 are adapted to be elastically deflected radially inwardly for installation of the first and second inner race rings 43, 47. Once the first and second inner race rings 43, 47 are installed, the first and second pulley fingers 34, 36 return to a neutral position in which the radially outwardly directed projections 34a, 36a and the radially inwardly directed projections 34b, 36b maintain the engaged components axially together.

Referring again to FIG. 1, the planetary roller assembly 14 further includes third and fourth inner axial bearings 64, 66 that are located respectively between the first face plate 50 and a first axial end 20a of the roller body 20 as well as between the second face plate 54 and a second axial end 20b of the roller body 20. This allows axial loads to be transmitted by the planetary roller assembly 14 from the spindle 12, through the planetary rollers 22 and the roller body 20 in one axial direction via the first and third axial bearings 60, 64, and in the second axial direction via the second and fourth axial bearings 62, 66 such that the axial loads can be transmitted to the housing 40 once the planetary roller screw drive 10 is assembled therein.

Figure 4:
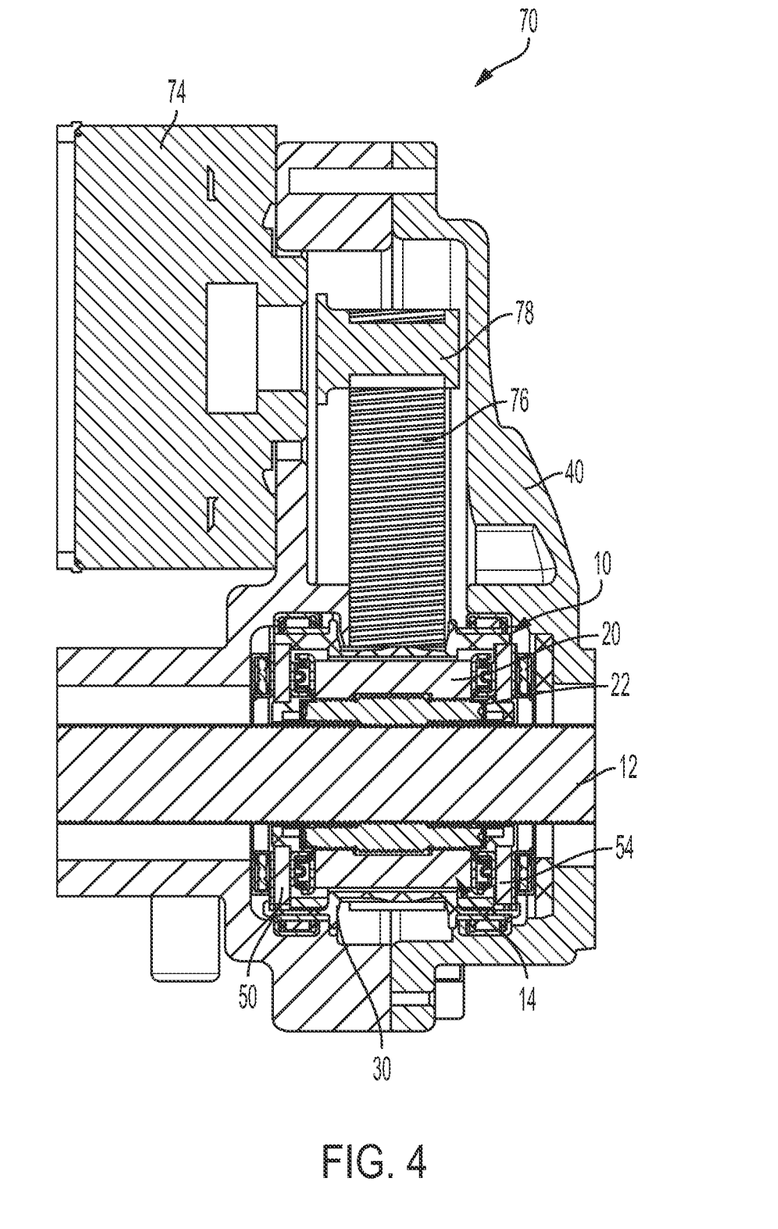
FIG. 4 is a cross-sectional view through a steering actuator which can be used in connection with a rear-axial steering system including the planetary roller screw drive shown in FIGS. 1-3.
Figure 5:
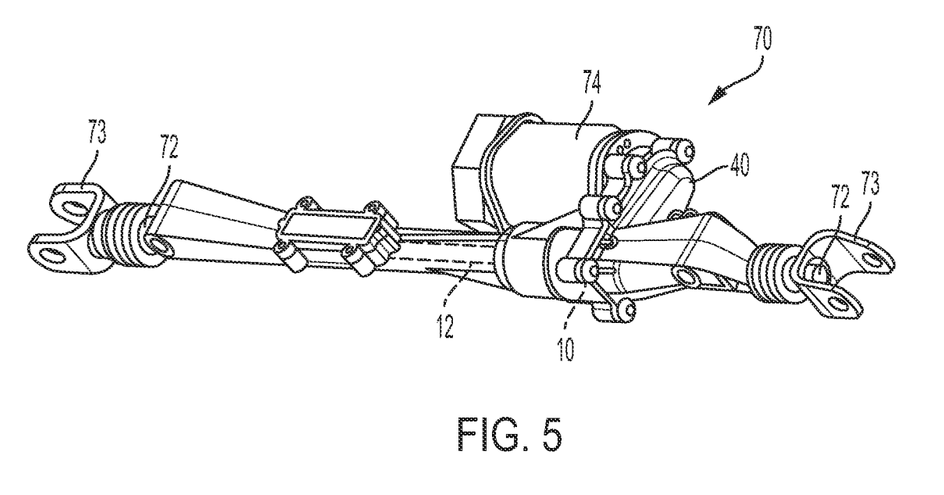
FIG. 5 is a perspective view showing the overall actuator for the rear-axial steering system including the push rods that are connected to or part of the screw spindle.

Referring now to FIGS. 4 and 5, an actuator 70, which can be for a rear-axle steering system of a motor vehicle, is shown. The actuator 70 includes the planetary roller screw drive 10 as discussed above, as well as a push rod 72 having ends that face away from one another that are configured for articulation of wheels that are to be steered on a motor vehicle. In the exemplary embodiment, the ends of the push rod 72 are provided with fork-shaped link heads 73. The ends of the push rod 72 which protrude from the housing 40 are preferably encased by bellows collars and covered as shown in the figure. The screw spindle 12, arranged in the housing 40, of the planetary roller screw drive 10 forms a central portion of the push rod 72. The push rod 72 can have two push rod parts which are arranged axially one behind the other and between which the screw spindle 12 is arranged and firmly connected to the two push rod parts. Alternatively, the push rod parts and the screw spindle 12 can be connected to one another in one piece.

As shown in detail in FIGS. 4 and 5, the actuator 70 further includes an electric motor 74 as well as a belt drive that includes a toothed belt 76 which loops around a motor pinon 78 of the electric motor 74 on one side and the drive pulley 30 on the other side. In this arrangement, the drive pulley 30 includes corresponding teeth 39 for the toothed belt 76 to engage.

As shown in FIGS. 4 and 5, the housing 40 accommodates the motor pinion 78 as well as the planetary roller screw drive 10 therein and the belt is also captive within the housing 40.

In another aspect, a method of assembling a planetary roller drive assembly 14 for a planetary roller screw drive 10 is provided. The method includes:
(a) assembling a roller body 20 onto planetary rollers 22 having a planetary groove profile which mesh via a roller body-side groove profile 24 with a roller body groove profile 21 of the roller body;
(b) rotatably mounting the planetary rollers 20 in a planetary roller carrier 28 such that the planetary rollers 22 are rotatably mounted about respective planetary roller axes thereof;
(c) installing a drive pulley 30 around the roller body 20;
(d) installing first and second face plates 50, 54 respectively at first and second axial end regions 30a, 30b of the drive pulley 30, with the first and second face plates 50, 54 being rotationally fixed to the planetary roller carrier 28a via a meshing feature, preferably the inwardly directed teeth 52, 56 of the first and second face plates 50, 54 engaging with complementary projections 29 of the planetary roller carrier 28, and the first and second face plates 50, 54 being rotationally fixed to the drive pulley 30 via radially inwardly directed teeth 32 at the first and second axial end regions 30a, 30b of the drive pulley 30 engaging with radially outwardly directed teeth 51, 55 of the first and second face plates 50, 54; and
(e) then installing respective first and second inner race rings 43, 47 of first and second radial bearings 42, 46 on to the respective first and second axial end regions 30a, 30b of the drive pulley 30, with the first and second inner race rings 43, 47 also being rotationally fixed to the first and second face plates 50, 54.

The method preferably also includes installing inner axial bearings 64, 66 at axial ends of the roller body 20 prior to installing the first and second face plates 50, 54 in step (d). The method may further include also installing outer axial bearings 60, 62 on the first and second face plates 50, 54 before installing the first and second inner race rings of first and second radial bearings in step (e). The method may further include providing the drive pulley 30 with the axially extending first and second pulley fingers 34, 36, as discussed above, with further method steps including:
(f) retaining the first inner race ring 43 axially on the drive pulley 30 with the radially outwardly directed projection 34a on the first pulley fingers 34; and
(g) retaining the second inner race ring 47 axially on the drive pulley 30 with the radially outwardly directed projections 36a on the second pulley fingers 36.

The method may further include the steps of:
(h) retaining the first face plate 50 axially in position with the radially inwardly directed projections 34b of the first pulley fingers 34; and
(i) retaining the second face plate 54 axially in position with the radially inwardly directed projections 36b of the second pulley fingers 36.

Further method steps may include:
(j) elastically deflecting the first and second pulley fingers 34, 36 radially outwardly for installation of the respective first and second face plates 50, 54 in step (d), as well as potentially the other internal components of the planetary roller assembly 14; and
(k) elastically deflecting the first and second pulley fingers 34, 36 radially inwardly for installation of the first and second inner race rings 43, 47 on the drive pulley 30 in step (e).

Assembly in this manner provides advantages over the prior known assembly techniques and allows the components of the planetary roller assembly 14 to be retained together is a simple manner.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 planetary roller screw drive
12 screw spindle
13 thread profile
14 planetary roller assembly
20 roller body
21 roller body groove profile
22 planetary rollers
23 planetary groove profiles
24 roller body-side groove profile
28 planetary roller carrier
28a pockets
29 complementary projections
30 drive pulley
30a first axial end region
30b second axial end region
30c radially outer surface
32 radially inwardly directed teeth
34 first pulley fingers
34a radially outwardly directed projection
34b radially inwardly directed projection
36 second pulley fingers
36a radially outwardly directed projection
36b radially inwardly directed projection
38a, b axially inwardly spaced annular projection
39 teeth
40 housing
42 first radial bearing
43 first inner race ring
43a radially inwardly directed projections
44 outer race ring
45 rollers
46 second radial bearing
47 second inner race ring
47a radially inwardly directed projections
48 outer race ring
49 rollers
50 first face plate
51 radially outwardly directed teeth
52 radially inwardly directed teeth
54 second face plate
55 radially outwardly directed teeth
56 radially inwardly directed teeth
60 first outer axial bearing
61 face plate-side race ring
62 second outer axial bearing
63 face plate-side race ring
64 third inner axial bearing
66 fourth inner axial bearing
70 actuator
72 push rod
73 fork-shaped link heads
74 electric motor
76 toothed belt
X axis

The invention claimed is:

1. A planetary roller screw drive, comprising:
a screw spindle;
a planetary roller assembly arranged on the screw spindle, the planetary roller assembly including;
a roller body,
planetary rollers, having a planetary groove profile and a roller body-side groove profile, arranged between the screw spindle and the roller body and which mesh via the planetary groove profile with a thread profile of the screw spindle and via the roller body-side groove profile with a roller body groove profile of the roller body,
a planetary roller carrier in which the planetary rollers are rotatably mounted about respective planetary roller axes thereof,
a drive pulley that is adapted to be rotatably driven about a spindle axis of the screw spindle and which is connected for conjoint rotation with the planetary roller carrier and is configured to be rotatably mounted on a housing via first and second radial bearings located at first and second axial end regions of the drive pulley, the first and second radial bearings including respective first and second inner race rings that are located on a radially outer surface of the drive pulley,
first and second face plates located respectively at the first and second axial end regions of the drive pulley, the first face plate being rotationally fixed to the first inner race ring via radially inwardly directed projections formed on the first inner race ring configured to engage the first face plate, and the second face plate being rotationally fixed to the second inner race ring via radially inwardly directed projections formed on the second inner race ring configured to engage the second face plate, and
the first and second face plates are rotationally fixed to the planetary roller carrier.

2. The planetary roller screw drive according to claim 1, wherein the drive pulley includes radially inwardly directed teeth at the first and second axial end regions, and the first and second face plates include corresponding radially outwardly directed teeth that engage with the inwardly directed teeth to rotationally fix the drive pulley to the first and second face plates.

3. The planetary roller screw drive according to claim 2, wherein the first and second face plates are rotationally fixed to the planetary roller carrier via radially inwardly directed teeth on the first and second face plates engaging with complementary projections of the planetary roller carrier.

4. The planetary roller screw drive according to claim 3, wherein the first face plate is rotationally fixed to the first inner race ring via the radially inwardly directed projections on the first inner race ring engaging with at least some of the corresponding radially outwardly directed teeth of the first face plate, and the second face plate is rotationally fixed to the second inner race ring via the radially inwardly directed projections on the second inner race ring engaging with at least some of the corresponding radially outwardly directed teeth of the second face plate.

5. A planetary roller screw drive, comprising:
a roller body,
planetary rollers, having a planetary groove profile and a roller body-side groove profile, arranged between the screw spindle and the roller body and which mesh via the planetary groove profile with a thread profile of the screw spindle and via the roller body-side groove profile with a roller body groove profile of the roller body,
a planetary roller carrier in which the planetary rollers are rotatably mounted about respective planetary roller axes thereof, a drive pulley that is adapted to be rotatably driven about a spindle axis of the screw spindle and which is connected for conjoint rotation with the planetary roller carrier and is configured to be rotatably mounted on a housing via first and second radial bearings located at first and second axial end regions of the drive pulley, the first and second radial bearings including respective first and second inner race rings that are located on a radially outer surface of the drive pulley, wherein the drive pulley includes axially extending first pulley fingers and axially extending second pulley fingers that extend respectively from the first and second axial end regions, the first and second pulley fingers being elastically deflectable radially inwardly and outwardly, the first pulley fingers each including a radially outwardly directed projection that is configured to retain the first inner race ring axially on the drive pulley, and the second pulley fingers each including a radially outwardly directed projection that is configured to retain the second inner race ring axially on the drive pulley, first and second face plates located respectively at the first and second axial end regions of the drive pulley, the first face plate being rotationally fixed to the first inner race ring and the second face plate being rotationally fixed to the second inner race ring, and the first and second face plates are rotationally fixed to the planetary roller carrier.

6. The planetary roller screw drive according to claim 5, wherein the first pulley fingers each including a radially inwardly directed projection that is configured to retain the first face plate axially in position, and the second pulley fingers each including a radially inwardly directed projection that is configured to retain the second face plate axially in position.

7. The planetary roller screw drive according to claim 6, wherein the planetary roller assembly further comprises first and second axial bearings configured to be located respectively between the first face plate and the housing and the second face plate and the housing, and the radially inwardly directed projections of the first and second pulley fingers engage respectively over face plate-side race rings of the first and second axial bearings.

8. The planetary roller screw drive according to claim 6, wherein the first and second pulley fingers are adapted to be elastically deflected radially outwardly for installation of the respective first and second face plates.

9. The planetary roller screw drive according to claim 8, wherein the first and second pulley fingers are adapted to be elastically deflected radially inwardly for installation of the first and second inner race rings.

10. The planetary roller screw drive according to claim 1, wherein the planetary roller assembly further comprises third and fourth axial bearings located respectively between the first face plate and a first axial end of the roller body and the second face plate and a second axial end of the roller body.

11. An actuator for a rear-axle steering system of a motor vehicle, comprising the planetary roller screw drive according to claim 1, a push rod having ends that face away from one another and are configured for articulation of rear wheels of the motor vehicle, and the screw spindle is part of or connected to the push rod.

12. The actuator according to claim 11, further comprising an electric motor, and a belt drive having a toothed belt which loops around a motor pinion of the electric motor and the drive pulley.

13. The actuator according to claim 12, further comprising the housing which accommodates the motor pinion and the planetary roller screw drive therein.

14. A method of assembling a planetary roller assembly for a planetary roller screw drive, the method comprising:

assembling a roller body onto planetary rollers having a planetary groove profile and a roller body-side groove profile, configured to be arranged between a screw spindle and the roller body and which mesh via the roller body-side groove profile with a roller body groove profile of the roller body;

rotatably mounting the planetary rollers in a planetary roller carrier such that the planetary rollers are rotatably mounted about respective planetary roller axes thereof;

installing a drive pulley around the roller body, wherein the drive pulley includes axially extending first pulley fingers and axially extending second pulley fingers that extend respectively from first and second axial end regions of the drive pulley, the first and second pulley fingers being elastically deflectable radially inwardly and outwardly, the first pulley fingers each including a radially outwardly directed projection and the second pulley fingers each including a radially outwardly directed projection;

installing first and second face plates respectively at the first and second axial end regions of the drive pulley, the first and second face plates being rotationally fixed to the planetary roller carrier via a meshing feature, and the first and second face plates being rotationally fixed to the drive pulley via radially inwardly directed teeth at the first and second axial end regions of the drive pulley engaging with radially outwardly directed teeth of the first and second face plates;

installing respective first and second inner race rings of first and second radial bearings onto the respective first and second axial end regions of the drive pulley, with the first and second inner race rings also being rotationally fixed to the first and second face plates;

retaining the first inner race ring axially on the drive pulley with the radially outwardly directed projection on the first pulley fingers; and retaining the second inner race ring axially on the drive pulley with the radially outwardly directed projections on the second pulley fingers.

15. The method of claim 14, further comprising:

installing inner axial bearings at axial ends of the roller body prior to installing the first and second face plates; and installing outer axial bearings on the first and second face plates prior to installing the first and second inner race rings of the first and second radial bearings.

16. The method claim 14, wherein the first pulley fingers each including a radially inwardly directed projection and the second pulley fingers each including a radially inwardly directed projection, and the method further includes:

retaining the first face plate axially in position with the radially inwardly directed projections of the first pulley fingers; and retaining the second face plate axially in position with the radially inwardly directed projections of the second pulley fingers.

17. The method of claim 16, wherein the planetary roller assembly further comprises first and second axial bearings adapted to be located respectively between the first and second face plates and a housing, and the radially inwardly directed projections of the first and second pulley fingers engage respectively over face plate-side race rings of the first and second axial bearings.

18. The method of claim 16, further comprising elastically deflecting the first and second pulley fingers radially outwardly for installation of the respective first and second face plates.

19. The method of claim 18, further comprising elastically deflecting the first and second pulley fingers radially inwardly for installation of the first and second inner race rings on the drive pulley.

* * * * *